United States Patent [19]

Smith-Williams

[11] Patent Number: 4,644,449
[45] Date of Patent: Feb. 17, 1987

[54] LIGHT BRACKET

[76] Inventor: Margie M. Smith-Williams, 7929 Stewart & Gray, #10, Downey, Calif. 90241

[21] Appl. No.: 693,292

[22] Filed: Jan. 22, 1985

[51] Int. Cl.$^4$ ............................................. B60Q 1/00
[52] U.S. Cl. ..................................... 362/80; 362/365
[58] Field of Search ............... 362/80, 83, 368, 391, 362/362, 364, 365, 267; 296/181, 182

[56] References Cited

U.S. PATENT DOCUMENTS

| 2,920,188 | 1/1960 | Clayton | 362/365 |
| 3,062,489 | 11/1962 | Zook | 362/80 |
| 4,325,105 | 4/1982 | Scimonelli | 362/365 |
| 4,342,074 | 7/1982 | Bull | 362/80 |
| 4,366,530 | 12/1982 | Milhous | 362/80 |

Primary Examiner—E. Rollins Cross
Attorney, Agent, or Firm—Keith D. Beecher

[57] ABSTRACT

A universal light bracket is provided for mounting tail lights on a wide variety of vehicles, such as motor cars; boats; utility, boat, car, horse trailers, and the like. The light bracket forms a housing for enclosing and protecting the tail light, and the housing has an open inner side with a flange extending along the length thereof to enable the bracket to be bolted or welded to the adjacent surface of the vehicle. The housing formed by the bracket has an open front, with a peripheral flange to permit the tail light to be mounted in the housing and to be visible through the open front. Because of its shape, the housing may conveniently be formed of a metal stamping, or of plastic.

6 Claims, 4 Drawing Figures

LIGHT BRACKET

BACKGROUND OF THE INVENTION

For the last several years, trailer tail lights in particular have proven to be a problem in that a variety of different types of brackets must be used to mount the tail lights on the trailers. In addition, the prior art mounting brackets usually protrude out from the mounting surface in a position to render them vulnerable to being broken, vibrating off, to be tripped over, and to strike the shins of persons in the vicinity. In addition, there is a tendency for the electric wires of the tail lights supported by such prior art brackets to be inadvertently scraped or pulled off because they are usually visible and unprotected.

The improved universal light bracket of the present invention provides full protection for the tail light and wires, because both the tail light and its wires are enclosed within the housing. Moreover, the bracket of the invention is shaped so that it becomes an integral part of the framework, and it is not weak or subject to breakage, and it is much less likely to create a hazard. The bracket may be mounted onto a vertical side or an angled side of a trailer framework.

The universal light bracket of the present invention is constructed to be light in weight, and its resulting shape is high in strength. It can be formed of any appropriate material, such as sheet steel, by a few simple stamping operations. Alternately, the light bracket may be formed of an appropriate plastic material. In addition, the bracket of the invention can be easily mounted onto the vehicle, as mentioned above, by a simple bolting or welding of its side flange to the supporting surface. The open side of the housing formed by the bracket permits ready access to the mounting flanges.

DETAILED DESCRIPTION OF THE ILLUSTRATED EMBODIMENT

Figure 1:
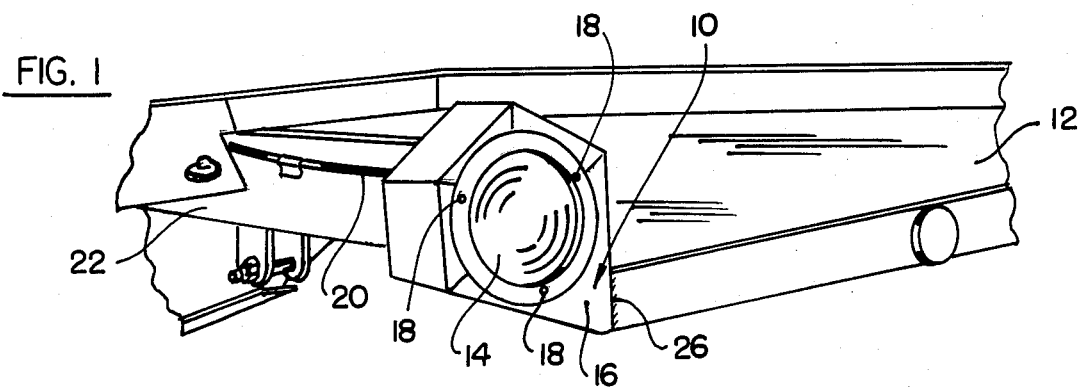
FIG. 1 is a fragmentary perspective representation of a typical utility trailer, having a tail light supported on its framework by a light bracket constructed in accordance with one embodiment of the present invention.

As mentioned above, the universal bracket 10 of the invention is extremely strong. It may be mounted onto car trailers where the frame may be angled. Also, and as shown in FIG. 1, the bracket 10 may be mounted on the straight sided frame of a typical utility trailer 12. A tail light 14 is mounted in bracket 10. A similar mirror image bracket may be mounted on the other side of the trailer to support a similar tail light.

Figure 4:
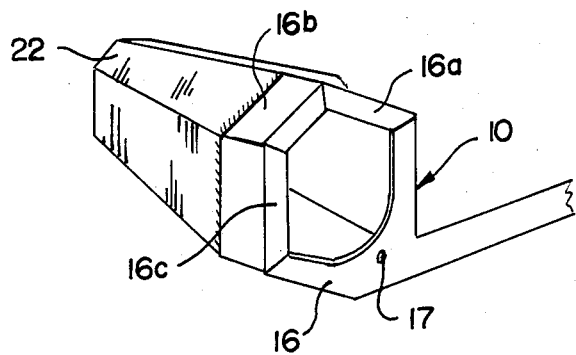
FIG. 4 is a perspective view of a modified construction of the light bracket which includes a protective extension cone.

The light bracket 10, as mentioned above, may be composed of sheet metal, and it may be formed by simple bending and/or stamping operations. The light bracket forms a housing for the tail light which has a rearward end which is surrounded by a flange 16 and folded-over flanges 16a, 16b, 16c. The flange 16 has an aperture 17 for receiving one of the mounting screws 18 of the tail light 14. The other mounting screws extend adjacent to the edges of flanges 16a, 16b, 16c and are held in place by flat spring-type nuts. In this manner, the tail light is supported within the bracket, and so that the face of the tail light may be exposed through the rearward end of the bracket. The ends of electric wires 20 for the tail light 14 are enclosed and protected by the bracket, and these wires extend into the rear end of the bracket, as shown. The bracket may have an extension protective cone 22 welded thereto, as shown in FIG. 4.

Figure 2:
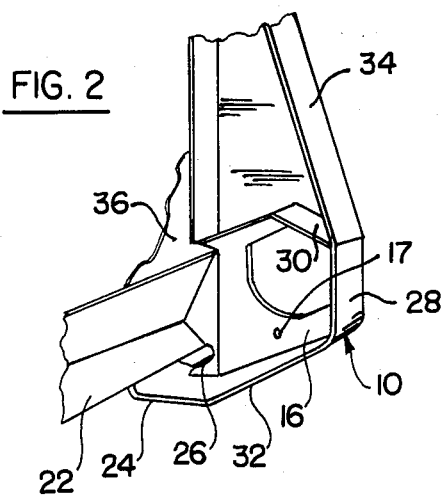
FIG. 2 is a forward perspective view of the tail light mounting bracket of FIG. 1, with the tail light removed, and with an extension welded thereto which serves as a rear corner reinforcement for the side of a box trailer.
Figure 3:
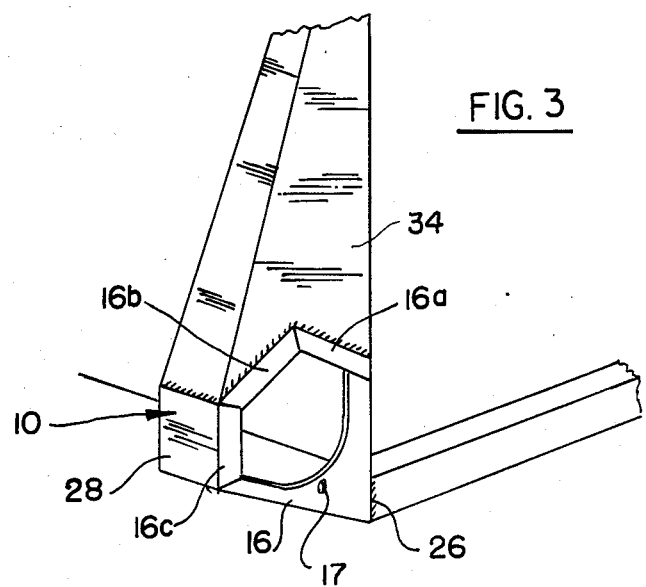
FIG. 3 is a rear perspective view of the light bracket of FIG. 2.

The light bracket housing has an open side, such as shown in FIG. 2, which receives the side of the trailer framework, and a flange 24 of the light bracket extends under the side. The flange 24 serves as mounting means for the light bracket 10, and it may have holes through which mounting screws or bolts for the bracket may extend. The flange may be welded, rather than bolted, to the frame of the vehicle if so desired. Also, the edges of the light bracket may be welded to the framework by a weld 26.

The light bracket housing 10 has a closed side 28, a pitched closed top 30, and a slanting closed bottom 32. A triangular-shaped extension 34 may be welded to the bracket 10, which extends upwardly from the bracket to serve as a rear reinforcement for the side 36 of a box trailer. The light bracket itself is strong enough, from its shape, to support the loading requirements of the trailer corner reinforcements.

The invention provides, therefore, a simple and inexpensive universal bracket for mounting a tail light on a trailer or other vehicle, and which is constructed to be capable of mounting the most popular and most practical of tail lights presently available on the market on a wide variety of vehicles in an unobtrusive and attractive manner, and forming a strong housing for enclosing and protecting the tail light and its electric wires, and serving as a high strength base for utility trailer rear corner reinforcements.

It will be understood that although a particular embodiment of the invention has been shown and described, modifications may be made. It is intended in the claims to cover the modifications which come within the true spirit and scope of the invention.

I claim:

1. A light bracket for mounting a tail light, on a vehicle comprising: a flat-sided housing including a multiple-component front member, the front member being formed of a first plurality of co-planar flange members which surround an opening therein and which are engaged by the tail light and serve to mount the tail light in position to be visible through the opening, and said front member further having a second plurality of flange members integral with said first plurality and extending perpendicularly rearwardly with respect to the flange members of said first plurality at the top and bottom and one side respectively of the front member.

2. The light bracket defined in claim 1, in which the other side of said front member is open, and in which said flange member of said second plurality at the bottom of said front member extends transversely through the open side of said front member to provide a mounting means for the bracket on the vehicle with said open side being adjacent to the vehicle.

3. The light bracket defined in claim 1, in which said flange member of said second plurality at the top of said front member comprises two sections joined together at an angle to form a pitched top for the housing, and said flange member of said second plurality at the bottom of said front member having a section slanting downwardly with respect to said flange member of said second plurality at said one side of said front member.

4. The light bracket defined in claim 1, in which said housing is formed of a metal stamping.

5. The light bracket defined in claim 1, in which said housing is formed of plastic.

6. The light bracket defined in claim 1, and which includes an additional conical shaped housing affixed to the rear edges of said flange members of said second plurality and serving to protect the back of the tail light and electric wires extending to the tail light.

* * * * *